United States Patent
Otte

(10) Patent No.: US 6,859,030 B2
(45) Date of Patent: Feb. 22, 2005

(54) METHOD FOR DETERMINING THE ROTATIONAL POSITION OF THE DRIVE SHAFT OF A DIRECT CURRENT MOTOR

(75) Inventor: Stefan Otte, Witten (DE)

(73) Assignee: Leopold Kostal GmbH & Co. KG, Ludenscheid (DE)

(*) Notice: Subject to any disclaimer, the term of this patent is extended or adjusted under 35 U.S.C. 154(b) by 182 days.

(21) Appl. No.: 10/313,618

(22) Filed: Dec. 6, 2002

(65) Prior Publication Data
US 2003/0111996 A1 Jun. 19, 2003

Related U.S. Application Data

(63) Continuation of application No. PCT/EP01/06217, filed on Jun. 1, 2001.

(30) Foreign Application Priority Data

Jun. 6, 2000 (DE) .......................................... 100 28 035

(51) Int. Cl.$^7$ ............................... G01P 3/48; H02P 1/22
(52) U.S. Cl. ........................ 324/166; 324/167; 318/286; 318/430
(58) Field of Search ................................. 324/166–174, 324/713, 716, 76.11, 76.39; 702/142, 145, 151; 318/286, 430, 565

(56) References Cited

U.S. PATENT DOCUMENTS

| | | | |
|---|---|---|---|
| 4,924,166 A | * 5/1990 | Roussel | ....................... 318/608 |
| 5,223,775 A | * 6/1993 | Mongeau | ...................... 318/432 |
| 5,432,421 A | 7/1995 | Kessler et al. | .............. 318/538 |

FOREIGN PATENT DOCUMENTS

| | | |
|---|---|---|
| DE | 197 29 238 C1 | 7/1997 |
| DE | 197 33 581 C1 | 8/1997 |
| DE | 198 55 996 C1 | 12/1998 |
| EP | 0 603 506 B1 | 11/1993 |

* cited by examiner

Primary Examiner—Vincent Q. Nguyen
(74) Attorney, Agent, or Firm—Brooks Kushman P.C.

(57) ABSTRACT

A method for determining the position of an element driven along a travel segment by a shaft of a motor includes counting current ripples detected in an armature current signal of the motor as the motor shaft rotates to drive the element. A first time interval between when the motor is turned on with power being supplied to the motor and when the first current ripple is detected is determined. A second time interval between when the last current ripple is detected after the motor has been turned off with the power supplied to the motor being interrupted and when the motor shaft stops rotating is determined. First and second current ripple components corresponding to the first and time intervals, respectively, are estimated. The position of the element along the travel segment is determined based on the counted current ripples and the estimated first and second current ripple components.

6 Claims, 1 Drawing Sheet

METHOD FOR DETERMINING THE ROTATIONAL POSITION OF THE DRIVE SHAFT OF A DIRECT CURRENT MOTOR

CROSS-REFERENCE TO RELATED APPLICATIONS

This is a continuation of International Application PCT/EP01/06217, published in German, with an international filing date of Jun. 1, 2001.

BACKGROUND OF THE INVENTION

1. Field of the Invention

The present invention relates to a method for determining the rotational position of the drive shaft of a direct current (DC) motor by evaluating the current ripple contained in the armature current signal.

2. Background Art

The armature current signal of a direct current (DC) motor includes a so-called direct component and a ripple component superimposed on the direct component. The ripple component arises when the DC motor is operated as a consequence of the interaction of the magnetic field, the armature winding, and the commutator of the DC motor. This expresses itself in a short-term change in the induced voltage, which produces the ripple content of the armature current signal. The current peaks contained in the armature current signal (referred to below as "current ripple") occur when the armature rotates, and have a frequency corresponding to the number of collector bars.

For example, if the armature has ten collector bars, the armature current signal accordingly has ten current ripples that can be identified in it. Thus, counting the current ripples can give information about the current rotational position of the armature of the DC motor and thus also regarding an element driven by it within a predetermined segment of travel. To accomplish this the analog armature current signal is digitized to be able to perform a corresponding counting.

Such processes are used, for example in the area of motor vehicles to control adjustment drives, such as are provided for power windows and/or sunroofs, for example. An essential element in capturing the position of the window glass, for example, is the position at which the pinching protection can be turned off when the window is closed. The pinching protection has to be turned off so that the window glass can go completely in its top block and into the seals provided there, without the motor being turned off as a result of increased load. If the counting of the current ripples to determine the position of the window glass is incorrect, it can happen that the pinching protection is turned off too early or too late.

However, such a process is subject to inaccuracies in determining the exact position due to the DC motor starting when power is supplied to it and slowing down when it is turned off. These inaccuracies result from the fact that when a DC motor starts, its armature has to rotate a certain amount before the first current ripple is detectable. The same goes for when the motor slows down, with the conventional process not being able to detect current ripples after the DC motor is turned off, so that the movement of the armature in the motor slowdown phase cannot enter into the position determination.

SUMMARY OF THE INVENTION

Therefore, starting from the prior art which has been discussed, the invention is based on the task of further developing the type of process mentioned at the beginning in such a way that it is possible to determine the position with higher accuracy.

This task is solved according to the invention in a method of the type mentioned at the beginning, which is characterized by a determination of the time interval between when power is supplied to the DC motor and when the first current ripple is detected;

a determination of the time interval between when the last current ripple is detected and when the armature of the DC motor stops, with the DC motor being switched over, when it is turned off, to generator operation for further current ripple detection;

a determination concerning the current ripple component corresponding to each time interval; and the use of the current ripple components to evaluate the current ripple count.

When such a method is used, the evaluation of the count result also takes into account that movement component of the DC motor's armature during which a current ripple is not yet detectable when the motor starts. For example, this is the angle by which the armature must rotate to form a first current ripple. This angle of rotation is always less than the difference in angle between two successive current ripples. Therefore, in this first startup phase of the DC motor before the first current ripple is detected, the armature can only be rotated by an angle which is smaller than the period ascribed to a current ripple.

To estimate the size of the current ripple component in this first motor startup phase before the first current ripple is detected, first the time interval is determined between when power is supplied to the DC motor, that is when it is turned on, and when the first current ripple is detected. A following step involves estimating the current ripple component corresponding to the time interval on the basis of the parameters of actually detected current ripples.

The process is similar when the DC motor stops, that is when it is turned off, with a first step involving switching the DC motor over to generator operation when it is turned off. Switching the DC motor over to generator operation means it is still possible to detect a current ripple caused by the armature which is slowing down. Just as is the case when the direct current motor starts up, when the motor is turned off the time interval is determined between when the last current ripple is detected and when the armature stops, which is followed by estimation of the current ripple component corresponding to this time interval.

An estimate of the current ripple component in the motor startup and slowdown phases is sufficient for the desired position determination to be sufficiently accurate. Moreover, using such an estimate offers the advantage that it is possible to work with simplified constraints, so that the investment, especially the requirements to be placed on an evaluation unit, for example a microprocessor, are only small.

It is expedient for each of the two current ripple components to be determined by comparing it with the duration of a predetermined detected reference current ripple assigned to a time interval: the motor start up phase or the motor slowdown phase. This comparison treats the relevant motor characteristics as a constant, with it being possible to provide that the load conditions are constant during the time intervals under discussion.

It is expedient for the reference current ripple that is used to determine the current ripple component during the motor startup phase before the first current ripple is detected to be one which is detected a certain number of current ripples after the first current ripple. This is done so that detection errors during the motor startup phase do not enter into the determination of the current ripple component even after the first current ripple is detected. To determine the current ripple component in the motor slowdown time interval, it is expedient for the reference current ripple that is used to be the one which was last detected before the motor was switched off, that is switched over.

DETAILED DESCRIPTION OF THE PREFERRED EMBODIMENT(S)

Figure 1:
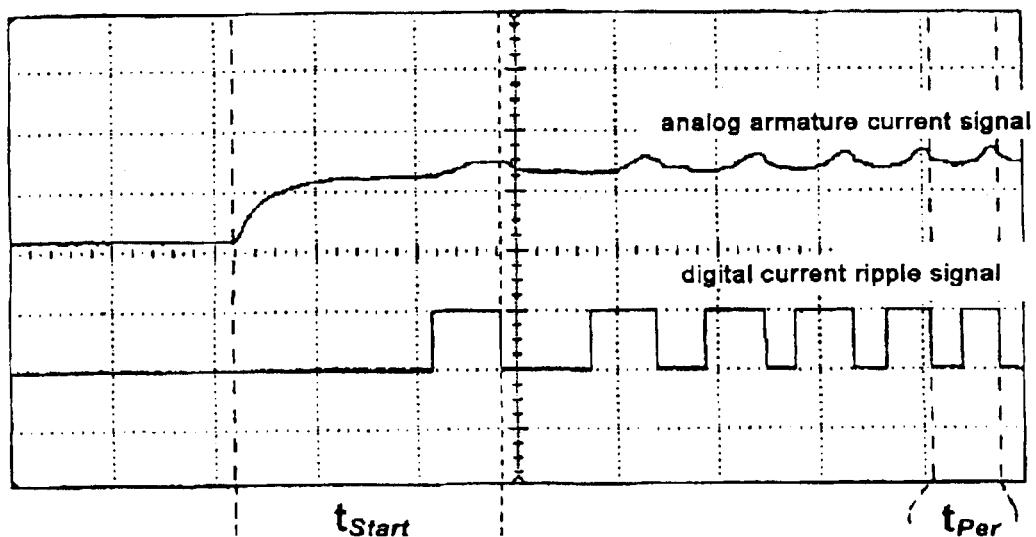
FIG. 1 is a diagram illustrating the filtered analog armature current signal and, below it, the digital current ripple signal derived from the armature current signal.

Referring now to FIG. 1, a diagram illustrating the filtered analog armature current signal and, below it, the digital current ripple signal derived from the armature current signal is shown. FIG. 1 also marks the phase during motor startup $t_{Start}$ for which the current ripple component should be determined. It is also possible to identify the period $t_{Per}$ which is used as a reference current ripple in order to be able to make the desired determination of the current ripple component.

It is possible to determine the size of the current ripple component during the first time interval $t_{Start}$ in the following way, for example:

$$\text{Current ripple component (motor start-up phase)} = (t_{Start} \cdot k)/t_{Per}$$

where k is the motor characteristic constant and $t_{Per}$ is the period of the reference current ripple.

Figure 2:
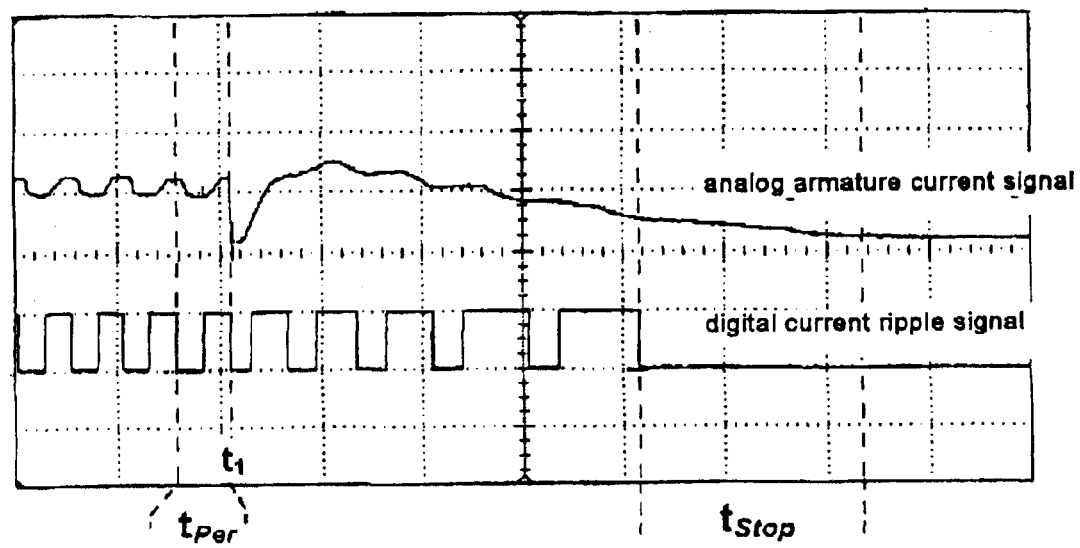
FIG. 2 is a corresponding diagram showing the filtered analog armature current signal and the current ripple determined from it when the motor stops.

Referring now to FIG. 2, a corresponding diagram illustrating the filtered analog armature current signal and the current ripple determined from it when the motor stops is shown. At time $t_1$ the DC motor is switched over to its generator operation, so that current ripples in the armature current signal are still detectable at first during the motor slowdown phase. In the last phase (marked with $t_{Stop}$ in FIG. 2) although there is still a certain rotational motion of the armature, a current ripple is no longer detectable. To estimate how many current ripple components this last rotational motion of the armature corresponds to, the current ripple which was last detected when power was being supplied to the motor is used as a reference and the period $t_{Per}$ is determined from it.

As was the case when the current ripple component was determined in the motor startup phase $t_{Start}$, the current ripple component in this motor slowdown time interval $t_{Stop}$ is determined in an analogous manner, with this determination also assuming that the relevant motor characteristics, for example the load, are constant. The estimate can then be done according to the formula given below:

$$\text{Current ripple component (motor slowdown phase)} = (t_{Stop} \cdot k)/t_{Per}$$

where k once again represents the relevant constant containing the motor characteristics.

This presentation makes it clear that the method according to the present invention reduces inaccuracies which result from the fact that when the motor starts up or stops it is not possible for a current ripple to be generated and detected during a certain portion of the rotation of the armature of the motor. For example, the current ripple components can be taken into consideration in a dedicated counter, which passes a counting pulse on to the actual current ripple counter if it has a whole part result.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the present invention.

What is claimed is:

1. A method for determining the position of a movable element driven along a travel segment by a shaft of a motor, the method comprising:

counting current ripples detected in an armature current signal of the motor as the motor shaft rotates to drive the movable element along the travel segment;

determining a first time interval between when the motor is turned on with power being supplied to the motor and when the first current ripple is detected;

determining a second time interval between when the last current ripple is detected after the motor has been turned off with the power supplied to the motor being interrupted and when the motor shaft stops rotating;

estimating a first current ripple component corresponding to the first time interval;

estimating a second current ripple component corresponding to the second time interval; and determining the position of the movable element along the travel segment based on the counted current ripples and the estimated first and second current ripple components.

2. The method of claim 1 further comprising:

switching the motor to generator operation in response to the motor being turned off to enable current ripples occurring after the motor has been turned off to be detected.

3. The method of claim 1 wherein:

the step of estimating the first current ripple component is carried out in accordance with the following formula:

$$\text{first ripple component} = (\text{first time interval} * k)/(\text{period of a counted current ripple})$$

where k is a motor characteristic constant.

4. The method of claim 3 wherein:

the counted current ripple is a current ripple occurring after the first detected current ripple.

5. The method of claim 1 wherein:

the step of estimating the second current ripple component is carried out in accordance with the following formula:

$$\text{second ripple component} = (\text{second time interval} * k)/(\text{period of a counted current ripple})$$

where k is a motor characteristic constant.

6. The method of claim 5 wherein:

the counted current ripple is the last detected current ripple prior to the motor being turned off.

* * * * *